United States Patent [19]
Hölsö et al.

[11] Patent Number: 5,139,730
[45] Date of Patent: Aug. 18, 1992

[54] METHOD AND APPARATUS FOR MANUFACTURING RIBBED PIPE

[75] Inventors: Paul Hölsö; Eino Hölsö, both of Viskafors, Sweden; Jyri Jarvenkyla, Salpakangas; Dieter Scharwächter, Espoo, both of Finland; Lennart Ågren, Borås, Sweden

[73] Assignee: Uponor N.V., Philipsburg, Netherlands Antilles

[21] Appl. No.: 679,014

[22] PCT Filed: Oct. 23, 1990

[86] PCT No.: PCT/FI90/00249
§ 371 Date: May 2, 1991
§ 102(e) Date: May 2, 1991

[87] PCT Pub. No.: WO91/06417
PCT Pub. Date: May 16, 1991

[30] Foreign Application Priority Data
Oct. 27, 1989 [FI] Finland .................................. 895106

[51] Int. Cl.⁵ ............................................. B29C 47/90
[52] U.S. Cl. ...................... 264/508; 264/209.4; 425/326.1; 425/336; 425/393; 425/396; 425/379.1
[58] Field of Search ...................... 264/508, 515, 209.2, 264/209.3, 209.4, 209.8; 425/327, 326.1, 380, 381, 396, 466, 467, 393, 403, 336, 379.1

[56] References Cited

U.S. PATENT DOCUMENTS

| | | | |
|---|---|---|---|
| 3,292,213 | 12/1966 | Donald | 425/381 |
| 3,613,162 | 10/1971 | Talsma | 425/466 |
| 3,994,646 | 11/1976 | Hauck | 425/396 |
| 3,998,579 | 12/1976 | Nordstrom | 425/396 |
| 4,721,594 | 1/1988 | Jarvenkyla | 425/396 |
| 4,867,928 | 9/1989 | Jasrvenkyla et al. | 425/327 |
| 4,983,347 | 1/1991 | Rahn | 425/396 |

FOREIGN PATENT DOCUMENTS

| | | |
|---|---|---|
| 10237900 | 9/1987 | European Pat. Off. |
| 8704113 | 7/1987 | World Int. Prop. O. |

Primary Examiner—Jeffery Thurlow
Attorney, Agent, or Firm—Ladas & Parry

[57] ABSTRACT

The invention relates to a method and apparatus for manufacturing ribbed piping, wherein a formable mass in a plastic state is extruded into a substantially cylindrical forming space of a corrugator, the forming space being delimited by forming molds movable in the production direction of the apparatus and having grooves on the inner surface thereof for forming rib flanges. A stationary kernel portion of a mandrel cools the interior surface of the piping and extends beyond the forming space constituted by the forming molds of the corrugator.

12 Claims, 2 Drawing Sheets

METHOD AND APPARATUS FOR MANUFACTURING RIBBED PIPE

FIELD OF THE INVENTION

This invention relates to a method and an apparatus for manufacturing ribbed pipe.

BACKGROUND OF THE INVENTION

Finnish Patents 60 825, 74 654 and 77 405 disclose manufacturing lines for ribbed pipes, wherein a formable mass brought into a plastic state is extruded by means of a die between movable forming means pressed against one another to achieve continuous production of ribbed pipe. With these prior art solutions, ribbed pipe products having a good quality and being commercially successful are achieved.

In prior manufacturing lines for ribbed pipes, cooling of the pipe has been arranged to be two-sided, i.e. both the forming means disposed against the exterior surface of the pipe and the interior mandrel supporting the pipe through the corrugator are cooled. However, slight waviness has been found on the inner surfaces of ribbed pipes thus produced, despite the mandrel arrangement suggested by Finnish Patent No. 74 654. It has been found that this is caused by depressions at the rib flanges, resulting from the fact that the rib flanges are cooled at different rates at different points, i.e. faster at the rib flange surfaces pressed into the grooves of the forming means than at the foot of each rib flange. Uneven cooling will result in uneven shrinkage of the material, which is manifested as said waviness on the inner surfaces of the pipe.

SUMMARY OF THE INVENTION

The object of this invention is to develop the manufacturing process for ribbed pipe further so that the above stated disadvantages are avoided. To achieve this, the method of the invention, wherein a formable mass in a plastic state is extruded into a substantially cylindrical forming space of a corrugator, said forming space being delimited by forming means, i.e. moulds, movable in the production direction of the apparatus and having grooves on the inner surface thereof for forming rib flanges, and a stationary mandrel forming the inner surface of the pipe, and wherein the mass formed as a pipe in the forming space is cooled, is characterized in that the ribbed pipe is cooled from the inner surface of the pipe with the mandrel which extends an essential length externally of the forming space constituted by the forming means of the corrugator.

The invention is based on the conception that when on the one hand rapid cooling is provided for the pipe from the interior, whereby the inner surface thereof will naturally be cooled rapidly and uniformly and be compacted as a glassy surface against the mandrel, and on the other hand cooling from the mold side is reduced or totally eliminated, flawless ribbed pipe is produced, as long as the softening of the pipe caused by the reduction in the cooling of the molds is compensated at the point when the pipe leaves the corrugator by supporting the pipe by means of an extended mandrel. The decrease in the cooling of the molds does not require any special operations; shortening of the corrugator as such already reduces the cooling effect, and the cooling can still be reduced or totally eliminated by modifying the cooling cycle in the molds and the temperature thereof. Measures of this kind are obvious to a person skilled in the art.

The most significant advantage of the invention is naturally that the production of ribbed pipes having a flawless inner surface is made possible. Additional advantage is provided by the fact that when in the known apparatus the length of the corrugator in the region where the forms are shut is of the order of 2.5 m, it may have a length of only 1 m when realized in accordance with the invention. When the size, complexity and weight (about 20 tons) of a normal corrugator are taken into account, reducing the size in this way has several advantageous multiplied effects. While a normal kernel has a length of about 0.5 m, a kernel length according to the invention is 1 to 3 m.

The apparatus of the invention, which is adapted to receive formable mass in a plastic state and which comprises a corrugator having a substantially cylindrical forming space delimited by forming means, i.e. molds, movable in the production direction of the apparatus and having grooves on the inner surface thereof for forming rib flanges, and a mandrel supporting the inner surface of the pipe, is characterized in that the mandrel within the ribbed pipe has cooling means for cooling the pipe, and that the mandrel extends an essential length externally of the forming space constituted by the forming means of the corrugator.

The other preferred embodiments of the invention are characterized by that which is disclosed in the claims hereinbelow.

DETAILED DESCRIPTION OF THE PREFERRED EMBODIMENT

Figure 1:
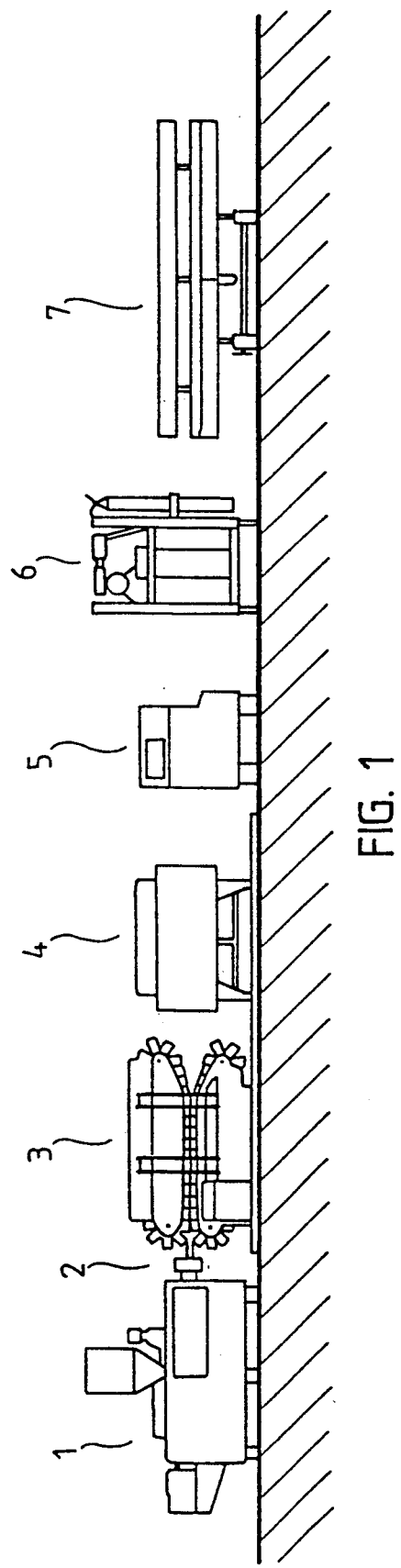
FIG. 1 shows a commonly known manufacturing line for ribbed pipes.

In the production line for ribbed pipe according to FIG. 1, the extruder is indicated with reference numeral 1, the die for the extruder with reference numeral 2, the corrugator with reference numeral 3, the cooling basin for the pipe with reference numeral 4, the pipe drawing apparatus with reference numeral 5, the cutting means with reference numeral 6 and the finishing and handling table for the pipe product cut to a predetermined length with reference numeral 7. The corrugator is of a type having two rotating paths for the forming means or molds. The purpose and function of the different devices in a production line of this kind are obvious to the person skilled in the art and are thus not more closely explained herein.

Figure 2:
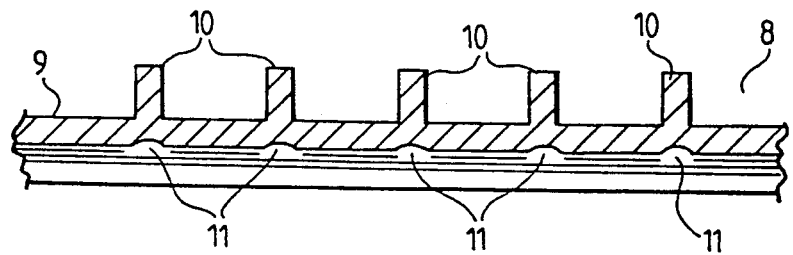
FIG. 2 shows a split surface portion of a ribbed pipe manufactured by known methods.

FIG. 2 shows ribbed pipe manufactured in the known manner, consisting of a pipe body 9 and rib flanges 10. It is seen that there are depressions 11 on the inner surface of the pipe at the rib flanges 10, resulting from the cooling problems set forth above.

Figure 3:
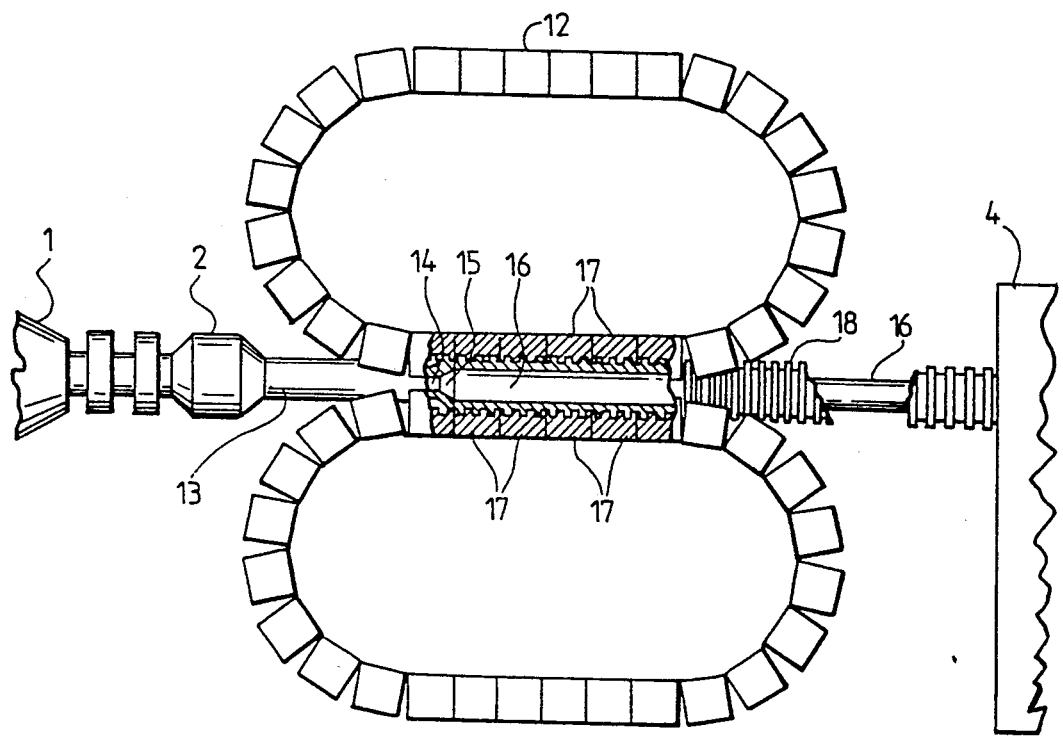
FIG. 3 shows a corrugator structure according to the invention.

FIG. 3 shows a corrugator 12 according to the invention, whereinto the extruder 1 feeds molten plastic mass in extrusion barrel 13 through die 2. The forming of the pipe is commenced in the barrel 13 which has a shaft 14 extending from the die to the corrugator. When the plastic pipe reaches the corrugator, the exterior surface thereof is formed by means of upper and lower forming means, i.e. molds 17, to have rib flanges. On the interior, the diameter is first enlarged by means of a conical portion of mandrel 16, whereafter the pipe slides along the cooled kernel portion 19 of mandrel 16 and leaves the corrugator as ribbed pipe 18.

In accordance with the invention, the mandrel 16 within the ribbed pipe 18 extends externally of the forming space of the corrugator, e.g. so that the mandrel supports the formed pipe up to the cooling basin 4 (cf. FIG. 1). Part of the tail end of the mandrel extending to the cooling basin may also be constituted by rods 23 supporting the pipe 18 (FIG. 4), the diameter of the circle defined by said rods corresponding to the diameter of the mandrel.

Figure 4:
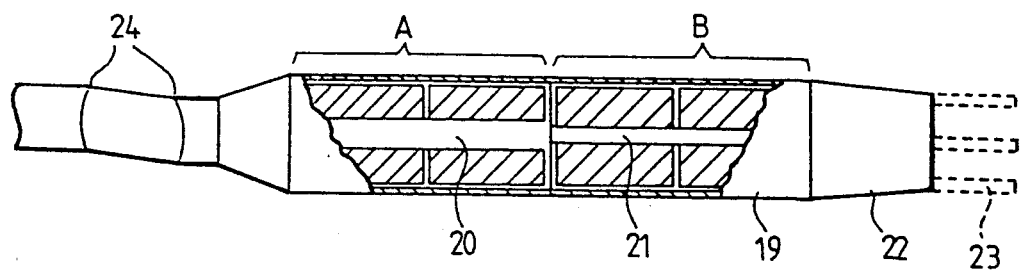
FIG. 4 shows the structure of a mandrel realized in accordance with the invention.

In the known apparatus, the length of the closed chains of the corrugator is of the order of 2.5 m, the kernel portion having a length of about 0.5 m. In accordance with the invention, these dimensions are essentially inverse; the length of the corrugator may be about 1 m and that of the kernel portion from about 1 m to about 3 m. Furthermore, the cooling of the ribbed pipe is adapted to be effective from the inner surface of the pipe by arranging a cooling medium recycle in the kernel portion for at least part of the length thereof, more advantageously two or more successive cooling medium cycles as shown in FIG. 4. The kernel portion 19 shown in this Figure has two successive and separate cooling cycles A and B whereinto the cooling medium is supplied via concentric pipes 20 and 21. By suitably adjusting e.g. the circulation rate and temperature of the cooling medium in the cooling zones, the desired temperature profile for the kernel portion and thereby for the pipe cooling is obtained.

The tail end 22 of the mandrel 16 is slightly conical toward the exit end to facilitate the detachment of the pipe. The detachment of the pipe from the mandrel at the tail end thereof can also be improved by supplying e.g. water between the mandrel and the pipe.

From the point of view of the final result, it is very essential in all pipe manufacturing lines that the corrugator and kernel portion are in line. Since in the arrangement of the invention the kernel portion is lengthy and heavy, the requirements for aligning the kernel portion increase. Thereby it is a great advantage if the attachment of the mandrel and the extruder does not have maximum rigidity as it normally has, but is resilient, allowing for the mandrel and thereby for the kernel portion a slight allowance for adjustment in all directions in the corrugator. A slight directional deviation in a tube being in a substantially molten state does not have any effect on the final result; the most important fact is, as has been stated, the alignment of the kernel portion within the corrugator. The apparatus unit of FIG. 3 constituted by the extrusion barrel 13, conical portion 15 and kernal portion 19 can thus be resiliently attached to the extruder feeding the corrugator by means of the arrangement shown in FIG. 4 which is based on the use of two spherical joints 24, said arrangement allowing within certain limits free floating of the mandrel relative to the extruder.

It is obvious to the person skilled in the art that the invention is not restricted to the examples present above, but the different embodiments of the invention may vary within the scope of the ensuing claims.

We claim:

1. A method for manufacturing ribbed piping, comprising the steps of extruding a formable mass in a plastic state into a substantially cylindrical forming space of a corrugator, said forming space being delimited by forming molds movable in a production direction and having grooves on an inner surface thereof for forming rib flanges on said piping, and forming a substantially smooth cylindrical interior surface of the piping by passing the ribbed piping over a cooled substantially cylindrical kernel portion of a mandrel said mandrel being positioned between the molds and extending beyond the forming space constituted by the axially moving forming molds of the corrugator.

2. A method as claimed in claim 1, wherein the kernel portion is cooled by means of a cooling medium cycle along a portion of its length.

3. A method as claimed in claim 2, wherein the kernel portion is cooled by means of two or more successive cooling medium cycles.

4. A method as claimed in claim 1, wherein the mandrel has a conical end portion which facilitates detachment of the ribbed piping from the mandrel.

5. A method as claimed in claim 4, further comprising the step of supplying a lubricating agent to the tail end of the mandrel, between the mandrel and the ribbed piping, to facilitate detachment of the piping from the mandrel.

6. A corrugator for use in manufacturing ribbed piping, comprising:
   forming molds movable in a production direction of the corrugator and delimitating a substantially cylindrical forming space formed within said molds to receive a formable mass in a plastic state, said molds having grooves formed on an inner surface thereof for forming rib flanges on said piping; and
   a mandrel positioned within said molds to support an interior surface of the piping and having a substantially cylindrical kernel portion, said mandrel extending beyond the forming space in the production direction and being provided with a cooling means for cooling the piping so that the interior surface of the piping forms a substantially smooth surface.

7. A corrugator according to claim 6, wherein the mandrel has a cooling medium cycle for at least a portion of its length thereof.

8. A corrugator according to claim 7, wherein the mandrel has two or more successive cooling medium cycles.

9. A corrugator according to claim 8, wherein a tail end of the mandrel is conical to facilitate detachment of the piping from the mandrel.

10. A corrugator according to claim 9, wherein rods extend from the tail end and the diameter of the circle defined by said rods substantially corresponds to the diameter of the tail end at the surface of the tail end that meets the rods.

11. A corrugator according to claim 6, wherein the mandrel is connectable to at least one spherical joint so that the mandrel may be resiliently attached to an extruder that can feed the formable mass to the corrugator.

12. A corrugator according to claim 6, wherein the corrugator has a length of about 1 meter and the kernel portion has a length of between 1 meter and 3 meters.

* * * * *